US00RE40030E

(19) United States
(12) Reissued Patent
Hergott et al.

(10) Patent Number: US RE40,030 E
(45) Date of Reissued Patent: Jan. 22, 2008

(54) METHOD AND MEANS FOR STUFFING NATURAL CASINGS WITH SAUSAGE EMULSION

(75) Inventors: Steven P. Hergott, West Des Moines, IA (US); David S. Hamblin, Norwalk, IA (US); Michael J. Hardy, West Des Moines, IA (US)

(73) Assignee: Stork Townsend Inc., Des Moines, IA (US)

(21) Appl. No.: 10/772,177

(22) Filed: Feb. 4, 2004

Related U.S. Patent Documents

Reissue of:
(64) Patent No.: 6,676,502
Issued: Jan. 13, 2004
Appl. No.: 10/160,931
Filed: May 31, 2002

(51) Int. Cl.
*A22C 11/00* (2006.01)

(52) U.S. Cl. ..... 452/33
(58) Field of Classification Search ..... 452/30–35, 452/37, 39, 46, 51
See application file for complete search history.

(56) References Cited

U.S. PATENT DOCUMENTS

| | | | | |
|---|---|---|---|---|
| 990,547 | A | | 4/1911 | Gunuskey |
| 997,547 | A | * | 4/1911 | Grunskey |
| 1,395,967 | A | | 11/1921 | Merli et al. |
| 2,568,491 | A | | 9/1951 | Edwards |
| 3,150,410 | A | | 9/1964 | Washburn |
| 3,195,176 | A | | 7/1965 | Washburn |
| 3,253,297 | A | | 5/1966 | Nuckles |
| 3,404,430 | A | | 10/1968 | Kielsmeier et al. |
| 3,480,449 | A | | 11/1969 | Sumption |
| 3,672,001 | A | | 6/1972 | Greider |
| 3,805,329 | A | | 4/1974 | Kollross |
| 3,805,480 | A | | 4/1974 | Cherio et al. |
| 3,826,852 | A | | 7/1974 | Levaco et al. |
| 3,952,370 | A | | 4/1976 | Greider |
| 3,964,236 | A | | 6/1976 | Smith |
| 4,112,546 | A | | 9/1978 | Muller |
| 4,202,075 | A | | 5/1980 | Michel et al. |
| RE30,390 | E | | 9/1980 | Kupcikevicius et al. |
| 4,257,146 | A | | 3/1981 | Karp |
| 4,434,527 | A | | 3/1984 | Staudenrausch et al. |
| 4,437,209 | A | | 3/1984 | Duroyon |
| 4,438,545 | A | | 3/1984 | Kupcikevicius et al. |
| 4,489,460 | A | | 12/1984 | Nausedas |
| 4,525,895 | A | | 7/1985 | Raudys |
| 4,580,316 | A | | 4/1986 | Gunter |
| 4,593,433 | A | | 6/1986 | Nausedas |
| 4,642,848 | A | | 2/1987 | Kollross |

(Continued)

FOREIGN PATENT DOCUMENTS

| | | |
|---|---|---|
| DE | 1136604 | 9/1962 |
| DE | 4232759 | 3/1994 |
| DE | 29819328 U1 | 10/1998 |
| DE | 10001423 A1 | 1/2000 |
| EP | 0379123 | 7/1990 |
| FR | 2780246 | 12/1999 |

*Primary Examiner*—Thomas Price

(57) ABSTRACT

A method and structure of stuffing natural casings with sausage material involves taking a plurality of natural casings of different lengths and diameters; pre-loading each of the casings on elongated hollow open ended sleeves shorter than the casings and having a diameter less than the casings by telescoping the casings on the outer surfaces of the sleeves, slidably mounting the sleeves on the open end of a meat stuffing tube of a sausage encasing machine; extruding meat emulsion through the stuffing tube into the casing mounted on the sleeve until the sleeve is slidably removed from the tube, removing the sleeve from the stuffing tube, repeating the use of the sleeve by preloading the sleeve with another natural casing.

6 Claims, 3 Drawing Sheets

U.S. PATENT DOCUMENTS

| | | | |
|---|---|---|---|
| 4,649,602 | A | 3/1987 | Kupcikevicius |
| 4,683,617 | A | 8/1987 | Raudys |
| 4,768,261 | A | 9/1988 | Nakamura |
| 4,893,377 | A | 1/1990 | Evans et al. |
| 4,970,758 | A | 11/1990 | Naples et al. |
| 4,991,260 | A | 2/1991 | Nausedas |
| 5,046,219 | A | 9/1991 | Stanley |
| 5,092,814 | A | 3/1992 | Kasai et al. |
| 5,147,239 | A | 9/1992 | Staudenrausch |
| 5,273,482 | A | 12/1993 | Beckman et al. |
| 5,297,983 | A | 3/1994 | Mueller et al. |
| 5,352,151 | A | 10/1994 | Piereder |
| 5,354,228 | A | 10/1994 | Smith et al. |
| 5,399,213 | A | 3/1995 | Oxley |
| 5,743,792 | A | 4/1998 | Hanten et al. |
| 5,813,906 | A | 9/1998 | Phillips |
| 5,830,050 | A | 11/1998 | Nakamura et al. |
| 5,842,914 | A | 12/1998 | Vermeer et al. |
| 6,050,888 | A | 4/2000 | Nakamura et al. |
| 6,056,635 | A | 5/2000 | Vermeer et al. |
| 6,066,035 | A | 5/2000 | Hergott et al. |
| 6,066,036 | A | 5/2000 | Carollo |
| 6,139,416 | A | 10/2000 | Toepfer |
| 6,524,177 | B2 | 2/2003 | Bolzacchini |
| 6,572,464 | B1 | 6/2003 | Hergott et al. |
| 6,585,580 | B1 | 7/2003 | Hergott et al. |
| 6,659,853 | B1 | 12/2003 | Hergott et al. |
| 6,659,854 | B1 | 12/2003 | Hergott et al. |

* cited by examiner

METHOD AND MEANS FOR STUFFING NATURAL CASINGS WITH SAUSAGE EMULSION

Matter enclosed in heavy brackets [ ] appears in the original patent but forms no part of this reissue specification; matter printed in italics indicates the additions made by reissue.

BACKGROUND OF THE INVENTION

Stuffing sausages with meat emulsion normally involves pumping meat emulsion through a hollow tube or sleeve towards a discharge end of the sleeve. A hollow tubular casing material is slidably mounted on the outside of the sleeve with an otherwise open end extending just beyond the discharge end of the sleeve. The open end of the casing is then closed in any convenient manner. The meat emulsion extruded out of the sleeve enters the casing which becomes filled with the pressure on the pumped meat emulsion slidably moving the casing off of the sleeve. The filled casing is then formed into links through conventional means. This process works well with artificial casings which can be shirred or telescopically compressed so that a casing thirty feet or so in length can be compressed into a shirred condition of slightly more than a foot in length, thus allowing many sausages to be made before a new shirred casing is placed on the sleeve.

However, in the case of natural casings comprised of the intestines of certain animals, the sausage making process is substantially slowed because the natural casings vary in length and are substantially shorter than artificial casings. As a result, the natural casings have to be replaced at a high frequency, thus creating substantial down time for the machine.

It is therefore a principal object of this invention to provide a method and means for stuffing natural casings with sausage emulsion which will greatly accelerate the stuffing of natural casings by preloading the casings on a quickly positioned auxiliary sleeve so that the natural casing on the preloaded sleeve can be instantly placed on the primary stuffing tube without manually inserting the natural casing over the end of the stuffing tube.

A further object of this invention is to provide a convenient arrangement for retaining the sleeve to the stuffing tube as the sleeve is placed on the tube.

A still further object of this invention is to provide a convenient arrangement for the sleeve to be automatically removed from the stuffing tube after the natural casing has been filled with meat emulsion upon leaving the outer surface of the sleeve.

These and other objects will be apparent to those skilled in the art.

SUMMARY OF THE INVENTION

A method of stuffing natural casings with sausage material involves taking a plurality of natural casings of different lengths and diameters; pre-loading each of the casings on elongated hollow open ended sleeves shorter than the casings and having a diameter less than the casings by telescoping the casings on the outer surfaces of the sleeves, and tying an open end of the casings over the open ends of the sleeves; slidably mounting the sleeves on the open end of a meat stuffing tube of a sausage encasing machine; extruding meat emulsion through the stuffing tube into the casing mounted on the sleeve until the sleeve is slidably removed from the tube caused in part by the movement of meat emulsion entering the casing; removing the sleeve from the stuffing tube, repeating the use of the sleeve by preloading the sleeve with another natural casing; and sequentially filling the casings on the preloaded sleeves with meat emulsion in accordance with the foregoing steps.

A natural casing sausage making machine has a frame, a meat emulsion pump, and a hollow stuffing tube connected to the pump and having a discharge end. A hollow open-ended sleeve is slidably mounted on the stuffing tube and has a discharge end registering with the discharge end of the stuffing tube. The sleeve is preloaded with a length of natural casing, which extends over at least a portion of the length of the sleeve. A radial flange on the end of the sleeve opposite the discharge end thereof abuts a radial flange or other stop element on the stuffing tube to automatically insure that the discharge end of the sleeve and tube register with each other. A detent element, preferably an annular radial groove in the stuffing tube can receive a registering annular rib on the inner diameter of the sleeve to yielding hold the sleeve in place in the time.

After the preloaded sleeve is in place on the stuffing tube, the tube is conveniently moved longitudinally forwardly towards a twisting and linking mechanism. When the casing is filled, the tube with the sleeve thereon is longitudinally moved away from the twisting and linking mechanism. A means for withdrawing the stuffing tube from the sleeve, such as a pivotal brake element is moved into the reverse longitudinal path of the radial flange of the sleeve to prevent it from moving rearwardly, whereupon the tube slidably withdraws from inside the sleeve, and the sleeve automatically drops to a suitable container for reuse without having to be handled by the machine operator.

DESCRIPTION OF THE EMBODIMENTS OF THE INVENTION

Figure 6:
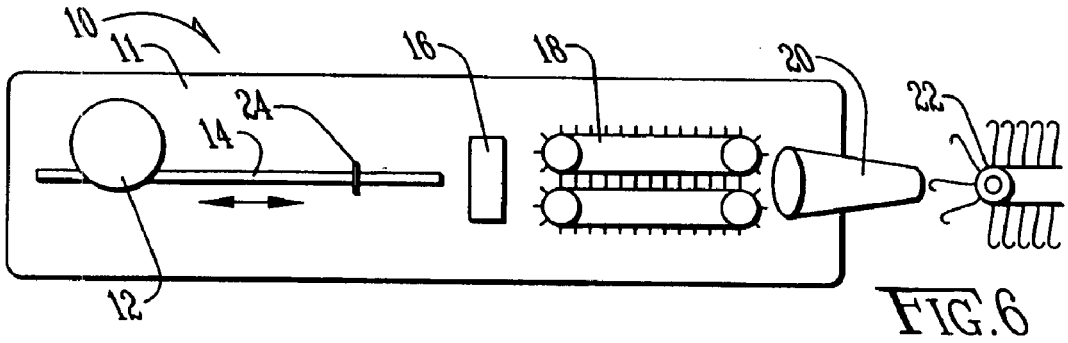
FIG. 6 is a plan view of the basic components of a sausage making machine.

With reference to FIG. 6, a conventional sausage making machine 10 has a frame 11, a pump 12 connected to a source of meat emulsion (not shown), a twisting mechanism 16, a linking mechanism 18, a discharge horn 20, and a conveyor 22.

Figure 1:
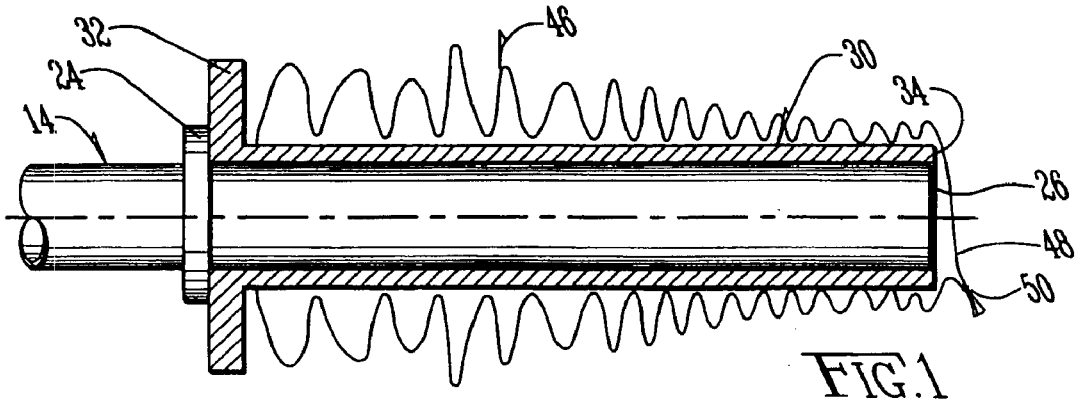
FIG. 1 is a longitudinal sectional view through a preloaded sleeve mounted on a stuffing tube of this invention.
Figure 2:
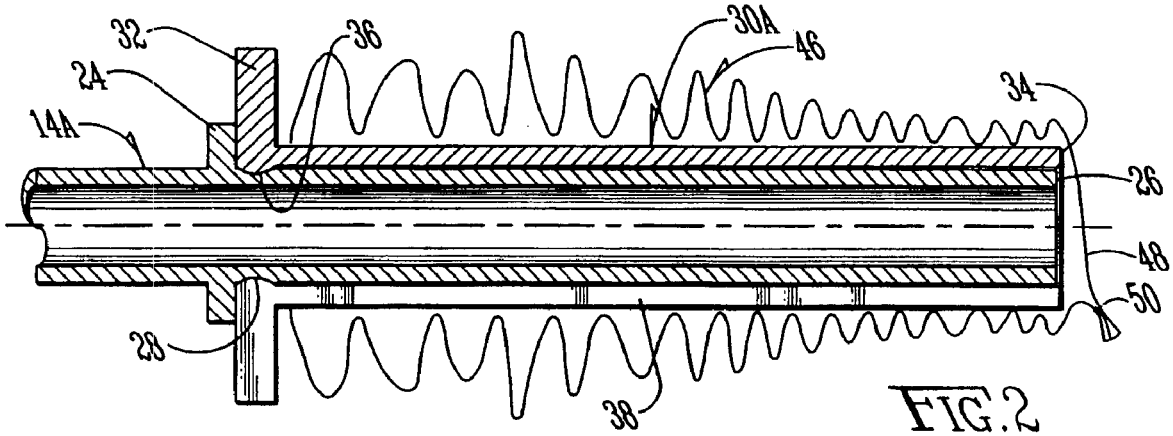
FIG. 2 is a longitudinal sectional view similar to FIG. 1 but shows an alternate form of preloaded sleeve.
Figure 2A:
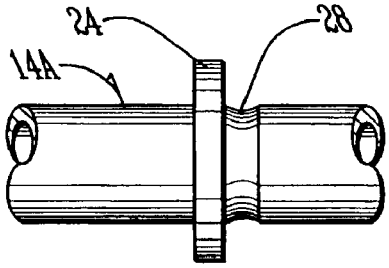
FIG. 2A is a partial elevational view at an enlarged scale showing the lefthand end of the stuffing tube in FIG. 2.
Figure 2B:
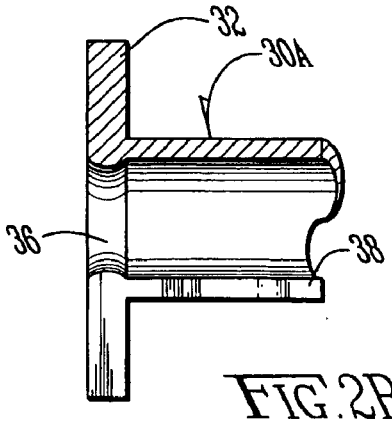
FIG. 2B is an enlarged scale sectional view of the lefthand end of the sleeve in FIG. 2.
Figure 4:
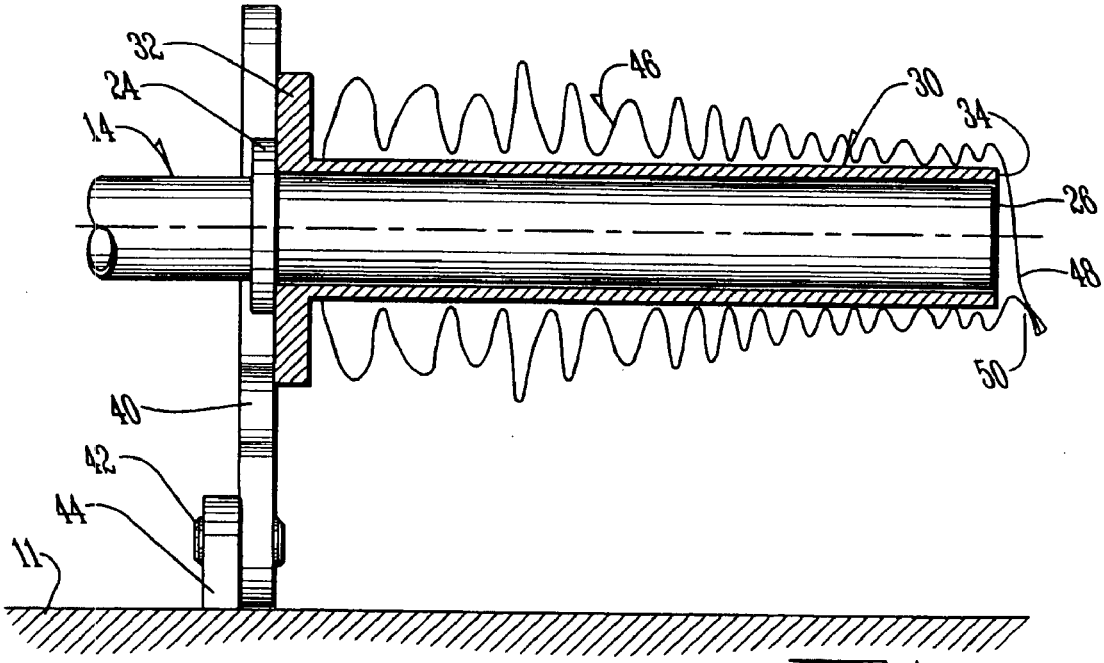
FIG. 4 is a view similar to that of FIG. 1 but shows a brake element in place to facilitate removal of the sleeve from the tube.

With reference to FIGS. 1, 2 and 4, the stuffing horns 14 (FIGS. 1 and 4) and 14A (FIG. 2) have an annular flange 24 extending radially outwardly at a location spaced from their discharge ends 26. As best shown in FIG. 2A, horn 14A has an annular groove 28 formed therein immediately forwardly of the flange 24.

Figure 2C:
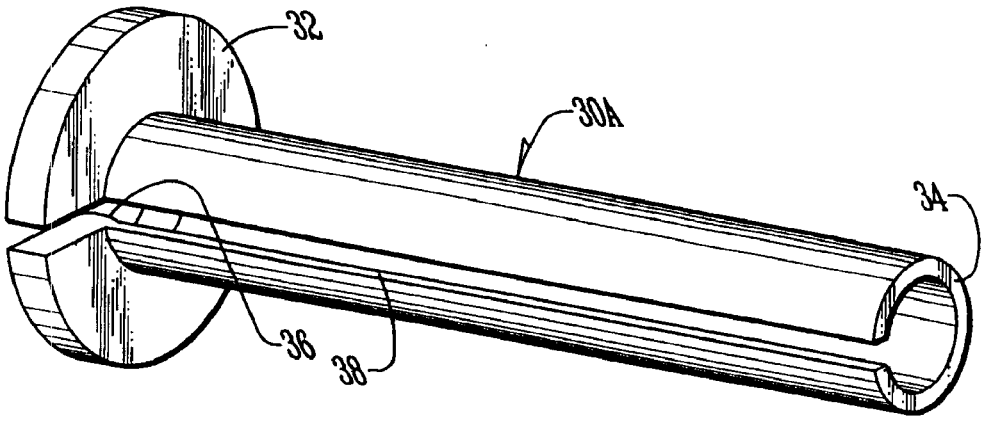
FIG. 2C is a perspective view of the sleeve of FIG. 2 rotated 90 degrees to more fully illustrate its construction.
Figure 3:
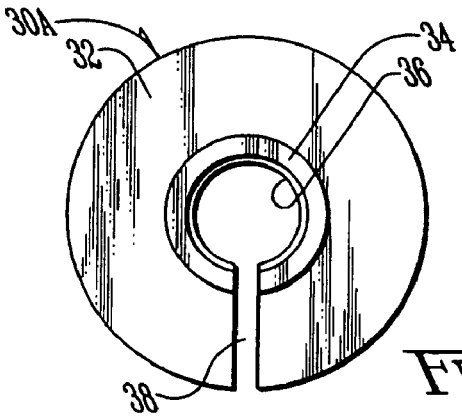
FIG. 3 is an end elevation of the device of FIG. 2 as viewed from the righthand end of FIG. 2 with the casing of FIG. 2 not being shown for clarity purposes.

A hollow casing mounting sleeve is slidably placed on each of the stuffing horns. See sleeve 30 on horns 14 in FIGS. 1 and 4, and sleeve 30A on horn 14A in FIG. 2. The length of each sleeve spans the distance between the flanges 24 and the discharge ends 26 of each stuffing horn. The sleeves all have an annular flange 32 of a diameter greater than flanges 24, and forwardly located discharge end 34 which each register with the discharge ends 26 of the stuffing tubes. The flanges 32 all abut flanges 24 on the stuffing tubes. Sleeve 30A has a protruding annular ring 36 thereon within flange 32. Ring 36 is complimentary in shape to annular groove 28 on stuffing horn 14A (FIG. 2) and normally dwells with the groove 28 to yieldingly hold the sleeve 30A on the stuffing tube 14A. An elongated slot 38 (FIG. 2C) permits the plastic sleeve 30A to flex slightly so that the ring 36 snaps into groove 28 on tube 14A (FIG. 2).

Figure 5:
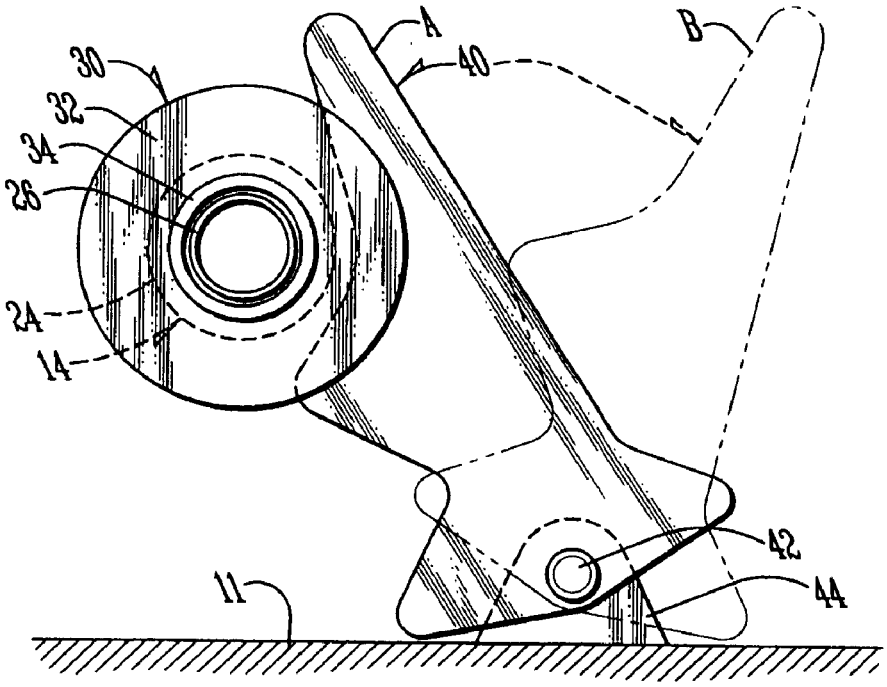
FIG. 5 is an end elevational view of FIG. 4 as seen from the lefthand of FIG. 4.

A brake element 40 is shown in FIGS. 4 and 5, and is pivotally mounted on frame 11 by means of pin 42 and bracket 44. A suitable power means (not shown) is adapted to cause brake element 40 to pivot between positions A and B as shown in FIG. 5. In position A, brake element will dwell behind flange 32 of the sleeves 30 and 30A and prevent the sleeves from moving longitudinally rearwardly when the stuffing tubes are withdrawn in a rearward direction at the completion of a sausage filling cycle. The withdrawal of the stuffing tubes from the sleeves allows the sleeves to drop into a suitable container (not shown) for further preloading with natural casings 46.

In operation, a plurality of casings 46 are preloaded on sleeves 30 or 30A. With the stuffing tubes 14 (or 14A) in their rearward or withdrawn positions of FIG. 1, the preloaded sleeves are slidably inserted over the forward ends of the tubes to assume the positions shown in FIGS. 1, 2 and 4. In the case of sleeve 30A, it is slightly flexed by means of slot 38 to permit annular ring 36 to snap into groove 28 to yieldably retain the sleeve on the tube. If brake element 40 is used, it will normally be in position A so as to engage flange 32 on the sleeves, but not flange 24 on the stuffing tubes.

The forward ends 48 of casings 46 extend just beyond the formal discharge ends of the sleeves and tubes as shown in FIGS. 1, 2 and 4, and are closed in any convenient way (e.g., tie element 50). The closing takes place at or during preloading.

The stuffing tubes are then conventionally moved forward so that their discharge ends are adjacent linker 18. The pump 12 is then started to pump meat emulsion into and through the stuffing tubes. The pressure of the meat emulsion engaging the closed ends of the casings moves the casings off of the tubes into the twister 16. When the casing 46 finally departs the sleeves, the pump is stopped; and the stuffing tubes are withdrawn. The sleeves are either manually removed from the stuffing tubes (FIGS. 1 and 4), or are automatically removed through the above-described action of brake element 40. A new preloaded sleeve is then replaced on the stuffing tube, and the cycle repeats itself.

It is seen that the advanced preloading of sleeves will greatly speed up the process, as compared to inserting a casing no the end of a stuffing tube each time a casing is filled. This invention will therefore achieve at least is stated objectives.

We claim:

1. A method of stuffing natural casings with sausage emulsion, comprising, preloading each of the casings on an elongated hollow open ended sleeve shorter than the casings with the sleeve having a first end and an open end which is of constant uninterrupted diameter between the first end and the open end and having diameter less than the casings by telescoping the casing on the outer surface of the sleeve, and extending an open end of the casing toward the open end of the sleeve, slidably mounting the sleeve over an open end of a meat stuffing tube of a sausage encasing machine, extruding meat emulsion through the stuffing tube into the casing mounted on the sleeve until the casing is slidably removed from the tube caused in part by the movement of meat emulsion entering the casing, repeating the use of the sleeve by preloading the sleeve with another natural casing, and sequentially filling the casing on the preloaded sleeve with meat emulsion in accordance with the foregoing steps, *and*

*wherein the stuffing tube is moved longitudinally to a twisting and linking station when a pre-loaded sleeve is mounted thereon, a brake element is moved into operative contact with the sleeve, the brake element selectively holding the sleeve against longitudinal movement while permitting the sleeve to all from supporting condition on the stuffing tube.*

[2. A natural casing sausage making machine having a frame, a meat emulsion pump, and a hollow stuffing tube with an open discharge end for discharging meat emulsion from the pump, comprising, a hollow open ended elongated sleeve with a first end and an open end which is of constant uninterrupted diameter between the first end and the open end and with a length shorter than the casings slidably mounted on the stuffing tube and having an open discharge end registering with the discharge end of the stuffing tube, the sleeve being preloaded with a natural casing having a diameter, the casing being in telescopic condition on the outer surface of the sleeve, and a radially extending flange adjacent one end of the sleeve to prevent the casing from sliding off that end of the sleeve.]

3. The machine of claim [2] *1* wherein a radial flange is on the sleeve at an end opposite its open discharge opening.

4. The machine of claim 3 wherein the stuffing tube has a stop element on its outer surface to engage the flange to limit the sliding action of the sleeve on the stuffing tube in one direction.

5. The machine of claim 4 wherein the stop element is positioned so that when it engages the flange the discharge openings of the sleeve and the stuffing tube register with each other.

[6. The method of claim 1 wherein the stuffing tube is moved longitudinally to a twisting and linking station when a pre-loaded sleeve is mounted thereon, a brake element is moved into operative contact with the sleeve to hold it against longitudinal movement, and the stuffing tube is then longitudinally withdrawn from the sleeve to permit the sleeve to fall from supporting condition on the stuffing tube.]

7. A natural casing sausage making machine having a frame, a meat emulsion pump, and a hollow stuffing tube with an open discharge end for discharging meat emulsion from the pump, comprising, a hollow open ended elongated sleeve slidably mounted on the stuffing tube and having an open discharge end registering with the discharge end of the stuffing tube, the sleeve being preloaded with a natural casing having a diameter and length greater than that of the sleeve, the casing being in telescopic condition on the outer surface of the sleeve, a radially extending flange adjacent one end of the sleeve to prevent the casing from sliding off that end of the sleeve, a stop element on the outer surface of the stuffing tube to engage the flange to limit the sliding action of the sleeve on the stuffing tube in one direction, the stop element being positioned so that when it engages the flange the discharge opening of the sleeve and the stuffing tube register with each other, a detent element interconnecting the sleeve with the stuffing tube to releasably connect the sleeve to the stuffing tube, the detect element being comprised of an annular groove extending around the outer surface of the stuffing tube with a detent element on the inner diameter of the sleeve to permit the detent element to releasably be inserted in to the annular groove, and an elongated slot on the sleeve and extending length of the sleeve to permit its diameter to be resiliently changed to facilitate the placement of the sleeve on the stuffing tube to accommodate the detent until the detent is located within the annular groove.

8. A natural casing sausage making machine having a frame, a meat emulsion pump, and a hollow stuffing tube with an open discharge end for discharging meat emulsion from the pump, comprising, a hollow open ended elongated sleeve slidably mounted on the stuffing tube and having an open discharge end registering with the discharge end of the stuffing tube, the sleeve being preloaded with a natural casing having a diameter and length greater than that of the sleeve, the casing being in telescopic condition on the outer surface of the sleeve, a radially extending flange adjacent one end of the sleeve to prevent the casing from sliding off that end of the sleeve, and a brake element pivotally mounted on the machine and positioned to contact the sleeve to selectively hold the sleeve against longitudinal movement, and means on the machine for withdrawing the stuffing tube from the sleeve after the casing on the sleeve has been removed from the stuffing tube and filled with meat emulsion.

* * * * *